United States Patent

Bosma et al.

(10) Patent No.: US 7,578,347 B2
(45) Date of Patent: Aug. 25, 2009

(54) METHOD OF SEALING AN ANNULAR SPACE IN A WELLBORE

(75) Inventors: Martin Gerard Rene Bosma, Assen (NL); Erik Kerst Cornelissen, Rijswijk (NL); John Alexander Gordon Dewar, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/667,903

(22) PCT Filed: Nov. 18, 2005

(86) PCT No.: PCT/EP2005/056057

§ 371 (c)(1), (2), (4) Date: Oct. 23, 2007

(87) PCT Pub. No.: WO2006/053896

PCT Pub. Date: May 26, 2006

(65) Prior Publication Data

US 2008/0135250 A1 Jun. 12, 2008

(30) Foreign Application Priority Data

Nov. 18, 2004 (EP) .................................. 04105894

(51) Int. Cl.
*E21B 33/138* (2006.01)
(52) U.S. Cl. .................. 166/294; 166/293; 166/300
(58) Field of Classification Search .................. None
See application file for complete search history.

(56) References Cited

U.S. PATENT DOCUMENTS

| 4,936,386 A | 6/1990 | Colangelo et al. ........... 166/292 |
| 5,623,993 A * | 4/1997 | Van Buskirk et al. ........ 166/292 |
| 6,517,732 B1 | 2/2003 | Brockoff et al. ............. 210/782 |
| 2004/0168804 A1 | 9/2004 | Reddy et al. ................. 166/295 |
| 2004/0194971 A1 | 10/2004 | Thomson ...................... 166/387 |

FOREIGN PATENT DOCUMENTS

| GB | 2338500 | 12/1999 |
| WO | WO03002227 A1 | 9/2003 |

* cited by examiner

*Primary Examiner*—Zakiya W. Bates

(57) ABSTRACT

A method of sealing a space in a wellbore formed in an earth formation comprises inserting a plurality of swellable particles into the space by pumping them in a carrier fluid, the particles being susceptible to swelling upon contact with a selected fluid, and inducing the selected fluid to contact the swelleable particles whereby the swelleable particles swell so as to form a body of swollen particles in the space.

17 Claims, 6 Drawing Sheets

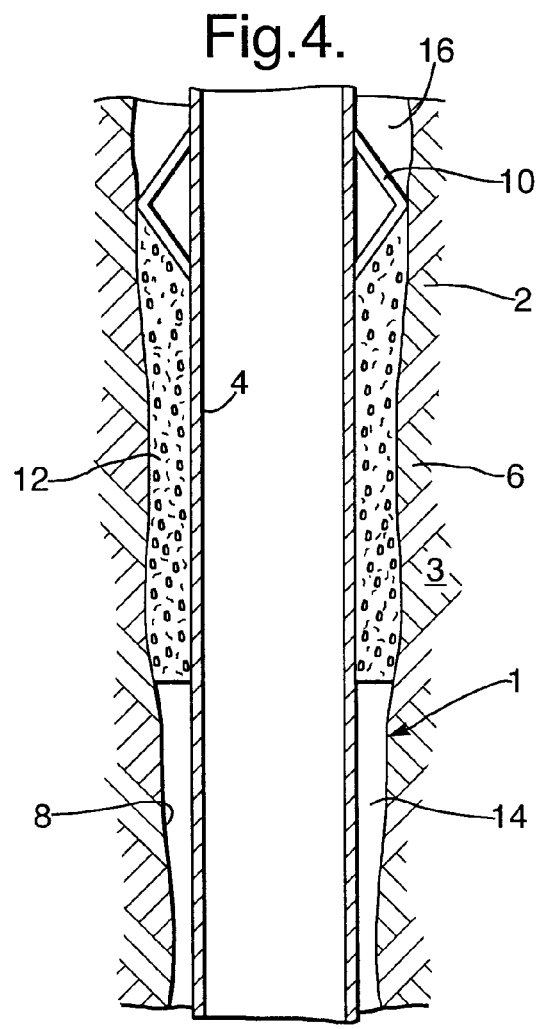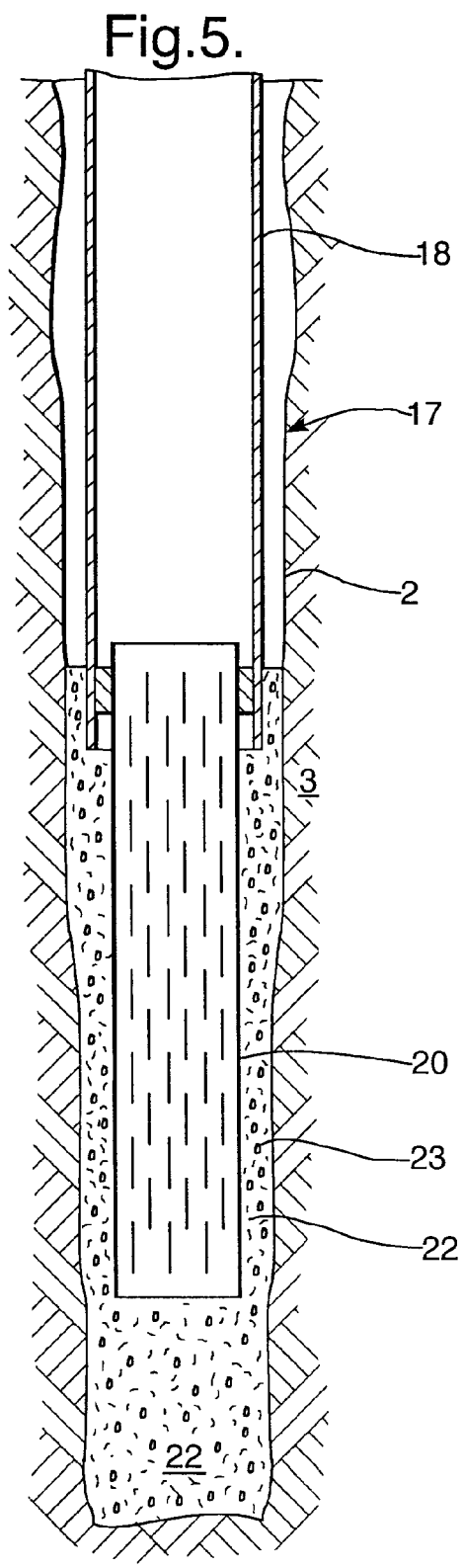

METHOD OF SEALING AN ANNULAR SPACE IN A WELLBORE

PRIORITY CLAIM

The present application claims priority from European Patent Application 04105894.2 filed 18 Nov. 2004.

FIELD OF THE INVENTION

The present invention relates to a method of sealing a space in a wellbore formed in a earth formation. For example, between a casing and the wellbore wall, between an inner casing and an outer casing, or between a production tubing and a casing.

BACKGROUND OF THE INVENTION

Generally a casing is sealed in the wellbore by a layer of cement between the casing and the wellbore wall. However it is known that cement does not always provide the desired degree of sealing in view of shrinkage of the cement during curing. As a result of such shrinkage, micro-annuli can occur in the cement which form a migration path leading to undesired flow of fluid through the wellbore.

Further, it has been proposed to seal an annular space between a tubular element arranged in the wellbore, and a wall extending around the tubular element, such as the wellbore wall, by means of an annular seal made of a material which swells upon contact with hydrocarbon fluid. The annular seal is connected to the outer surface of the tubular element, and the tubular element with the annular seal connected thereto is then lowered into the wellbore. When hydrocarbon fluid flows into the annular space, the seal swells and thereby seals the annular space. Although such method of sealing has provided good results, an inherent problem is the occurrence of possible damage to the seal during lowering of the tubular element into the wellbore, particularly if the annular space is narrow. In some useful applications the annular space is even extremely narrow so that proper lowering of the tubular element with the seal connected thereto is impossible.

Also, adequate sealing will be difficult if the space to be sealed has an irregular shape. For example, if the space is (partly) defined by the wellbore wall, adequate sealing using an annular seal can be impossible if the wellbore has washed-out sections which inadvertently occurred during drilling of the wellbore.

SUMMARY OF INVENTION

In accordance with the invention there is provided a method of sealing a space in a wellbore formed in an earth formation, the method comprising inserting a plurality of swelleable particles into said space, the particles being susceptible of swelling upon contact with a selected fluid, and inducing said selected fluid to contact the swelleable particles whereby the swelleable particles swell so as to form a body of swollen particles in said space.

BRIEF DESCRIPTION OF DRAWINGS

The invention will be described hereinafter in more detail and by way of example, with reference to the accompanying drawings in which:

FIG. 4 schematically shows a wellbore provided with a casing and an annular seal between the casing and the wellbore wall;

FIG. 5 schematically shows a wellbore provided with a slotted production liner and gravel pack between the liner and the wellbore wall;

DETAILED DESCRIPTION OF INVENTION

Figure 1:
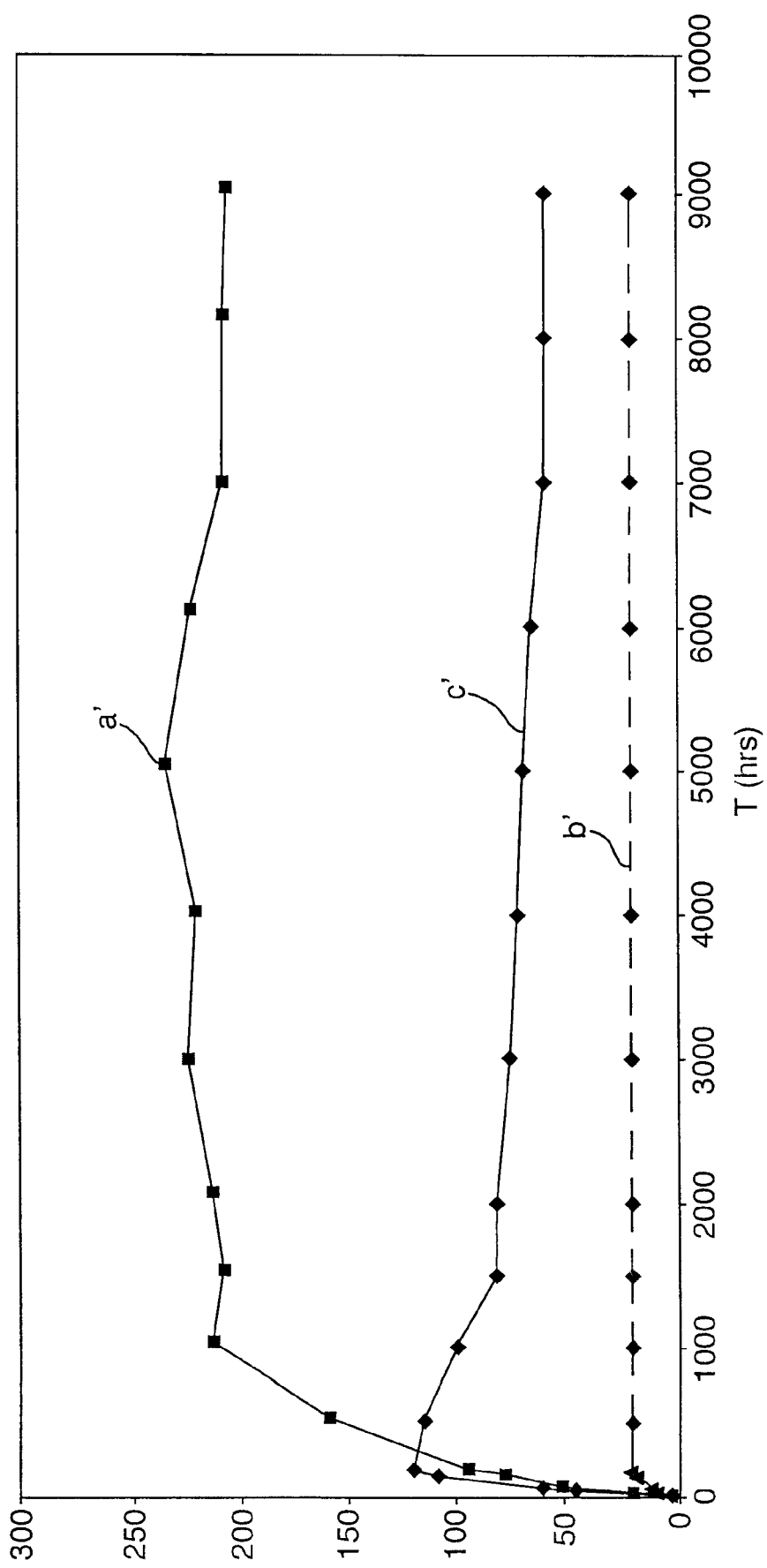
FIG. 1 schematically shows the swelling behaviour of various rubber compositions when immersed in saline water, over a relatively long period of time.

In one embodiment said space is an annular space defined between a tubular element extending into the wellbore and a wall extending around the tubular element. Alternatively, said space is (a portion of) the interior of a tubular element extending into the wellbore, or (a portion of) the wellbore itself. In such application the body of swollen particles suitably forms a plug in said space, for example for the purpose of abandonment of the wellbore.

In one embodiment the tubular element is a production conduit for transporting formation fluid to surface, and said wall is the wellbore wall or the wellbore casing. Alternatively, the tubular element is a wellbore casing and said wall is the wellbore wall or another wellbore casing. For ease of reference, the term "wellbore casing" as used herein is intended to mean both a wellbore casing and a wellbore liner. In conventional terminology a wellbore casing extends from a downhole location up to surface, whereas a wellbore liner does not filly extend up to surface.

If the annular space is to be (partly) filled with cement, which is normally the case for the annular space between an inner casing and an outer casing, or the annular space between a casing and a wellbore wall, it is preferred that the swelleable particles are mixed into a stream of cement which is subsequently pumped into the annular space. In this way it is achieved that seepage of well fluid through possible micro-cracks in the cement, is mitigated by virtue of the sealing effect of the particles which swell upon contact with water from the cement or upon contact with the seeping fluid.

Alternatively the swelleable particles can be pumped into the annular space before or after pumping the cement into the annular space. In that case the body of swollen particles will be arranged above or below the cement layer in the annular space so as to form an additional seal layer in the annular space.

In another embodiment the tubular element is a production conduit having an inlet opening for formation fluid, and said wall is the wellbore wall, wherein the step of inserting the swelleable particles comprises depositing the particles between said inlet opening and the wellbore wall. In this manner it is achieved that inflow of undesired fluid, such as water for an oil well, into the production conduit is reduced or prevented by virtue of swelling of the particles upon contact with the undesired fluid.

The step of inducing said selected fluid to flow into contact with the swelleable particles can include, for example, pumping of the selected fluid into the annular space, inserting the selected fluid in a container into the wellbore and subsequently releasing the fluid from the container, or placing the swelleable particles near a cement layer so that excess water from the cement triggers swelling of the particles. Also, swelling of the particles can be induced by produced well fluid, such as oil or formation water, which comes into contact with the swelleable particles when the well is taken in11 production. In case the selected fluid is formation water, swelling of the particles may take place only after a prolonged period of continued oil production.

In case the selected fluid is water from the earth formation, suitably the swelleable particles include a matrix material provided with a compound soluble in said formation water, wherein the matrix material substantially prevents or restricts migration of the compound out of the swelleable particles and allows migration of said formation water into the swelleable particles by osmosis so as to induce swelling of the swelleable particles upon migration of said formation water into the swelleable particles.

In this manner it is achieved that, by virtue of the presence of said compound, the swelleable particles swell due to osmosis even if the formation water has a high salinity.

To prevent or reduce leaching of said compound out of the matrix material, it is preferred that the particles include a matrix material substantially impermeable to said compound or to ions formed of said compound.

Preferably the matrix material includes a polymer matrix material, for example a thermoset elastomer matrix material or a thermoplastic elastomer matrix material.

Suitable thermoset elastomer materials capable of withstanding the high wellbore temperatures for a prolonged period of time are:

1) rubber materials which, apart from swelling in water, also swell in crude oil present in petroleum wells, such as ethylene propylene rubber (EPM and EPDM), ethylene-propylene-diene terpolymer rubber (EPT), butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), silicone Rubbers (VMQ) and fluorsilicone rubber (FVMQ);

2) rubber materials which do not swell in crude oil, such as butadiene acrylonitrile copolymer (Nitrile Rubber, NBR), hydrogenated NBR (HNBR, HNS) such as ZETPOL®, TORNAC®, TERBAN®, NBR with reactive groups (X-NBR), fluoro rubbers (FKM), such as VITON®, FLUOREL®, perfluoro rubbers (FFKM) such as KALREZ®, CHEMRAZ® and Tetrafluorethylene/propylene (TFE/P), such as AFLAS®, which would not swell when exposed to oil field crudes.

Most of these elastomers can be crosslinked by more than one crosslinking agent, for example sulphur or peroxide.

Apart from the thermoset (non swelling and oil swelling) elastomer matrix materials quoted above, also blends of elastomers can be applied ('elastomeric alloys'). Although an almost inexhaustible combination of thermoplastic and thermoset elastomers are feasible, the most preferred ones are the EPDM/polypropylene blends such as SARLINK®, Levaflex®, Santoprene®, NBR-polypropylene blends such as GEOLAST®, NBR/polyvinyl-chloride blends and NR/polypropylene blends. All of these have a tendency to swell in petroleum crudes, especially at the targeted downhole well temperatures.

Examples of suitable materials which swell when in contact with water are: starch-polyacrylate acid graft copolymer, polyvinyl alcohol cyclic acid anhydride graft copolymer, isobutylene maleic anhydride, acrylic acid type polymers, vinylacetate-acrylate copolymer, polyethylene oxide polymers, carboxymethyl cellulose type polymers, starch-polyacrylonitrile graft copolymers and the like, and highly swelling clay minerals such as Sodium Bentonite having montmorillonite as main ingredient.

Preferably said compound is present in the form of particulate matter embedded in the matrix material.

One example of such particulate matter is salt, preferably dissociating salt, which can be uniformly compounded into the base rubber. Suitable the salt is one of the group of acetates (M-$CH_3COO$), bicarbonates (M-$HCO_3$), carbonates (M-$CO_3$), formates (M-$HCO_2$), halides ($M_x$-$H_y$)(H=Cl, Br or I), hydrosulphides (M-HS), hydroxides (M-OH), imides (M-NH), nitrates (M-$NO_3$), nitrides (M-N), nitrites (M-$NO_2$), phosphates (M-$PO_4$), sulphides (M-S) and sulphates (M-$SO_4$), wherein M is a metal selected from the group of metals of the periodic table. Also, other salts are can be applied wherein the cation is a non-metal like $NH_4Cl$. However the preferred salts are NaCl and $CaCl_2$. Of these, $CaCl_2$ is most preferred in view of its divalent characteristic and because of its reduced tendency to leach out from the base rubber due to reduced mobility of the relatively large Ca atom in the base rubber.

To limit leaching out of the salt from the elastomer, suitably the swelleable particles include a hydrophilic polymer containing polar groups of either oxygen or nitrogen in the backbone or side groups of the polymer matrix material. These side groups can be partially or fully neutralised. Hydrophilic polymers of such type are, for example, alcohols, acrylates, methacrylates, acetates, aldehydes, ketones, sulfonates, anhydrides, maleic anhydrides, nitrites, acrylonitriles, amines, amides, oxides (polyethylene oxide), cellulose types including all derivatives of these types, all copolymers including one of the above all grafted variants.

Suitably a ternary system is applied which includes an elastomer, a polar SAP and a salt, whereby the polar SAP is grafted onto the backbone of the elastomer. Such system has the advantage that the polar SAP particles tend to retain the salt particles in the elastomer matrix thereby reducing leaching of the salt from the elastomer. The polar salt is attracted by electrostatic forces to the polar SAP molecules which are grafted ('glued') onto the backbone of the rubber.

Preferably the swelleable particles should be capable of swelling in water of salinity as high as 140 grams/liter sodium chloride, and containing considerable concentrations of bivalent ions, such as at least 40 grams/liter calcium chloride and 8 grams/liter magnesium chloride, and at a temperature of at least 40° C. but preferably at temperatures between 100-150° C. Such temperatures are typical for static downhole hole conditions. The transition from non-swollen to fully swollen state suitably takes place in a period ranging from a few hours to several weeks, depending on the material of the swelleable particles and the fluid used to trigger swelling of the particles. For achieving unhampered placement and settlement of the swelleable particles, suitably full swelling takes place within a timeframe of 2-3 weeks. The swollen state of the particles should be maintained for a period of at least one year.

If the swelleable particles need to have increased weight, for example in order to enhance settling in the lower part of the wellbore, the swelleable particles can be provided with a core of a heavier material than the matrix material. For example a core of glass, sand, bauxite, ceramics or metal, such as lead, bismuth steel shot, can be applied.

In the Figures like reference numerals relate to like components.

Figure 2:
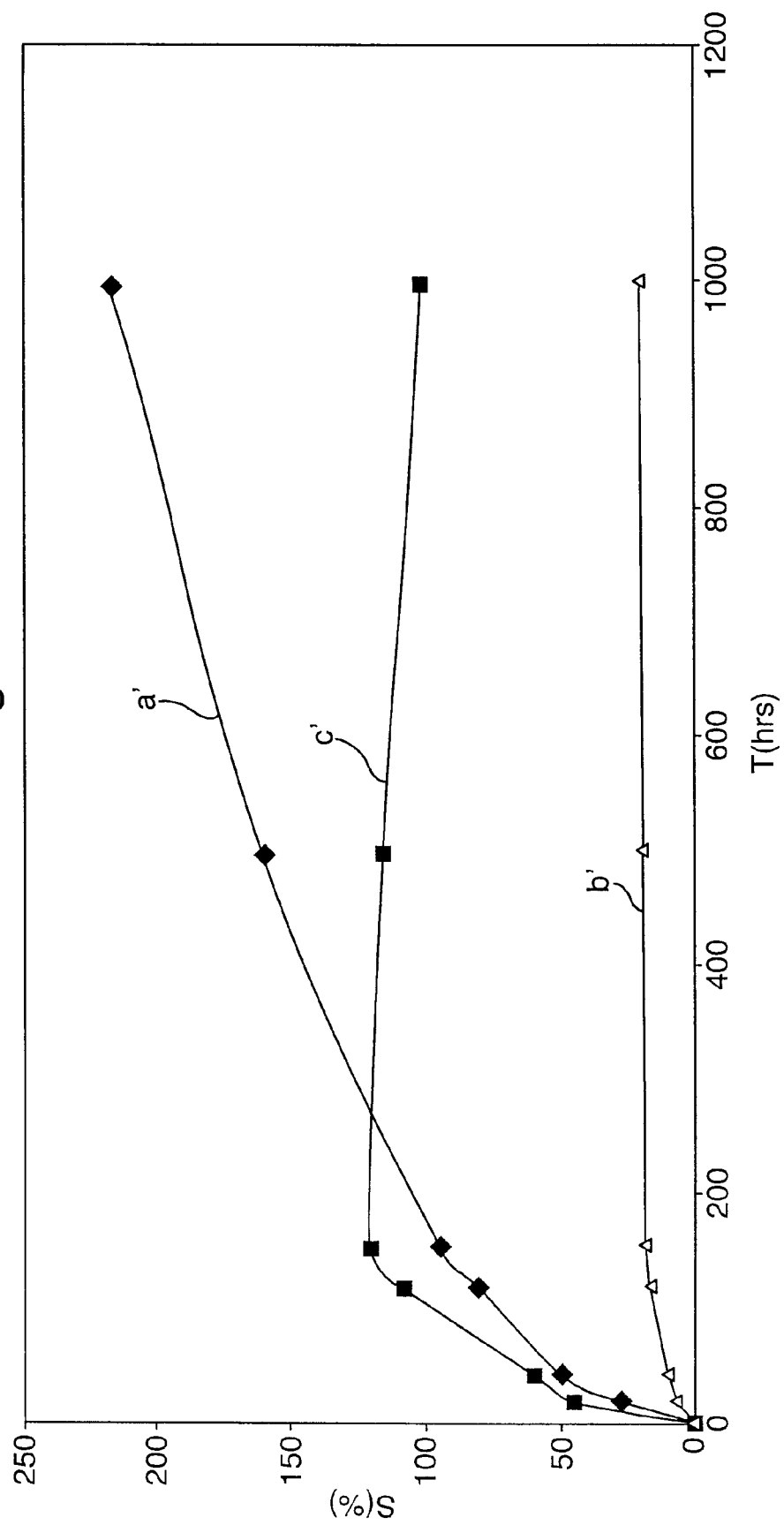
FIG. 2 schematically shows the swelling behaviour of the rubber compositions of FIG. 1 over a relatively short period of time.

FIGS. 1 and 2 indicate the swelling ratio (S) as a function of time, of three compositions marketed by RUMA®, Hoogeveen, the Netherlands. The compositions are available under the names:

900-70-1236, indicated by line a'
900-70-1354, indicated by line b'
900-70-1211, indicated by line c'

These compositions have as base material EPDM rubber matrix material available from Bayer®, Leverkusen, Germany under the trade name Buna EP® EPT-5459/6950, and include conventional reinforcing agents, fillers, vulcanizing agents, and stabilisers.

Additionally:

composition 900 70-1236 includes NaCl particles available from AKZO, the Netherlands under the trade name MICROZO® moulded into the rubber matrix material to a concentration of 35% by weight of the rubber matrix material;

composition 900-70-1354 includes a SAP (and no salt); and composition 900-70-1211 includes salt and a SAP.

From the Figures it is clear that composition 900-70-1236 shows an excellent swelling ratio of more than 200% by volume, when in contact with highly saline petroleum aquifer brines containing appreciable quantities of Bi-valent ions such as $Ca_2+$ and $Mg_2+$. Composition 900-70-1354 has a poor swelling performance (about 18% by volume), and the hybrid composition 900-70-1211 has a swelling performance in between the performance of compositions 900-70-1354 and 900-70-1236.

Figure 3:
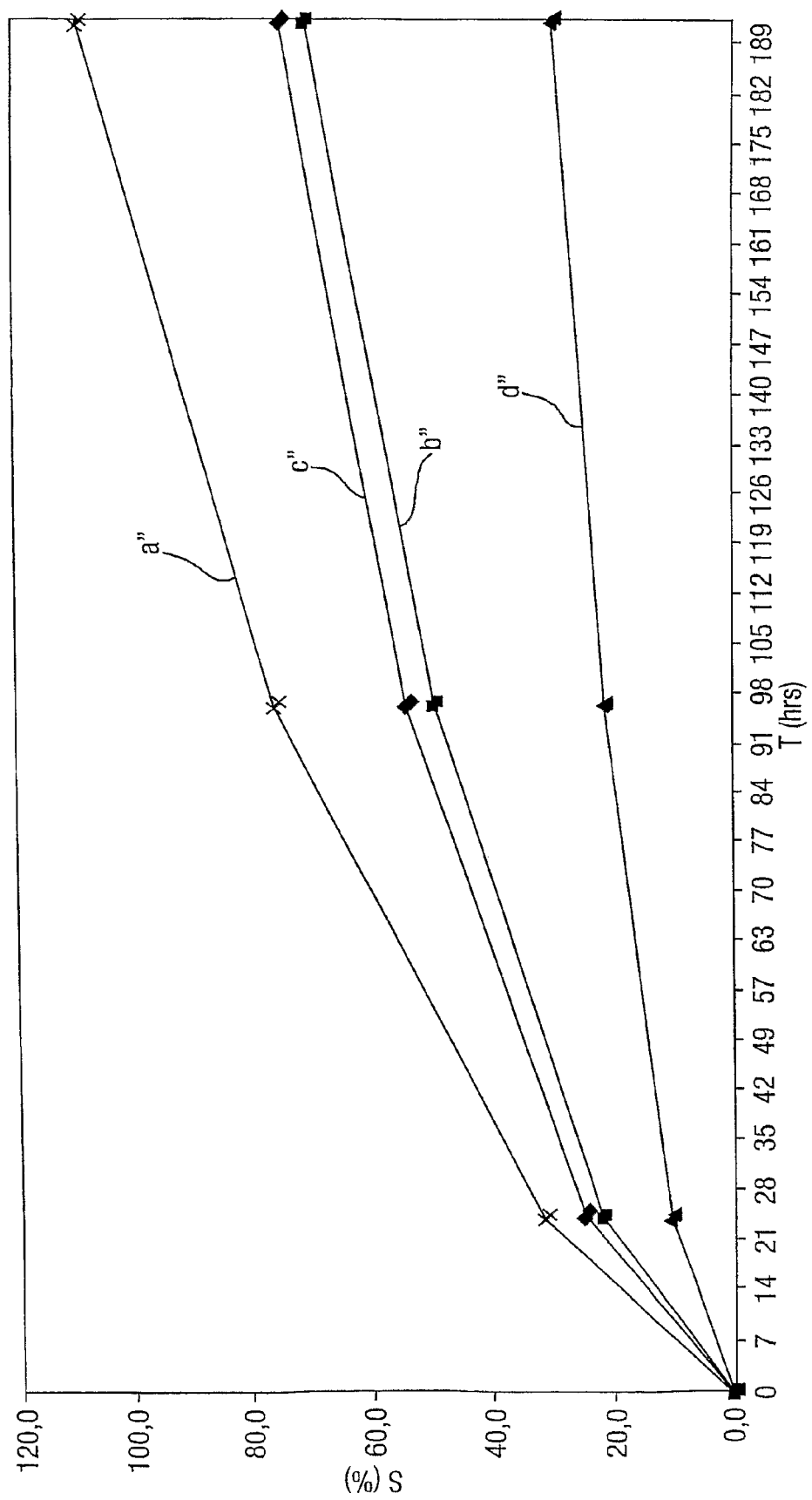
FIG. 3 schematically shows the swelling behaviour of a rubber composition when immersed in saline water, for various concentrations of salt contained in the rubber composition.

In FIG. 3 is shown a diagram indicating the swelling ratio (S) of compositions based on composition 900-70-1236, but now for varying concentrations of NaCl particles in the rubber matrix material Buna EP® EPT-5459/6950. The salt particle concentrations are:

34.8 wt %, indicated by line a"
26.3 wt %, indicated by line b"
41.6 wt %, indicated by line c"
15.1 wt %, indicated by line d"

All other additives in these compositions were kept constant.

It appeared that the optimum swelling ratio was achieved for concentrations of NaCl particles in the range of 32-37% by weight, based on the weight of the matrix material. The NaCl particles were moulded into the rubber matrix material prior to vulcanization of the rubber, using a conventional moulding apparatus (not shown) such as a) the two roll mill, b) the mixing mill, or c) the Gordon Plasticator. For a complete review of such techniques reference can be made to:

Werner Hoffman, Rubber Technology Handbook, 2nd ed. (1996), Hanser/Gardner Publications, Cincinnati, ISBN 1-56990-145-7 Chapter 5: Processing of elastomers, 'Compound Preparation'.

Referring to FIG. 4 there is shown a wellbore system 1 for the production of oil, including a wellbore 2 formed in an earth formation 3, and a casing 4 extending from surface into the wellbore 2, whereby an annular space 6 is formed between the wellbore wall 8 and the casing 4. The casing 4 is provided with a centraliser 10 extending radially outward in the annular space 6 so as to locate the casing 4 substantially centrally in the wellbore 2. The centraliser 10 is provided with flow-openings (not shown) capable of blocking axial flow of particles through the annular space 6 while allowing axial flow of fluid through the annular space. An annular body 12 formed of swelleable rubber particles is packed in the annular space 6 thereby dividing the annular space 6 into a portion 14 below the annular body 12 and a portion 16 above the annular body 12. The swelleable rubber particles are made of composition 900-70-1236 referred to above.

In FIG. 5 is shown a wellbore system 17 for the production of oil, including a wellbore 2 formed in an earth formation 3 and a casing 18 extending from surface into the wellbore 2. A slotted production liner 20 extends from the lower end of the casing 18 into the lower section of the wellbore 2 which is formed in the oil containing formation. A gravel pack 22 formed of sand particles and swelleable rubber particles, is arranged in the lower section of the wellbore 2 so as to substantially fill an annular space 23 between the slotted production liner 20 and the wellbore wall. The rubber particles are made of composition 900 70-1236 referred to above.

Figure 6:
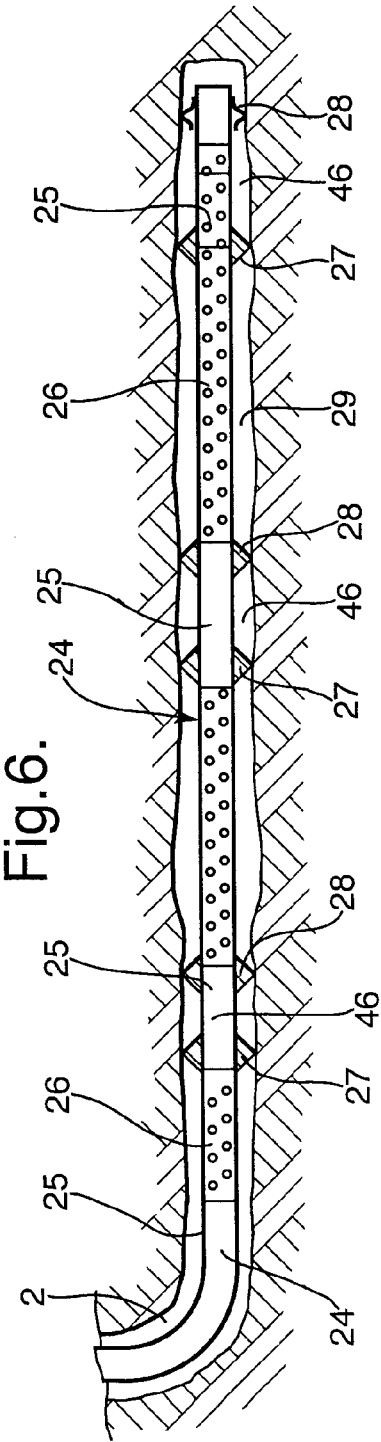
FIG. 6 schematically shows a completion string in a reservoir section of a wellbore.
Figure 7:
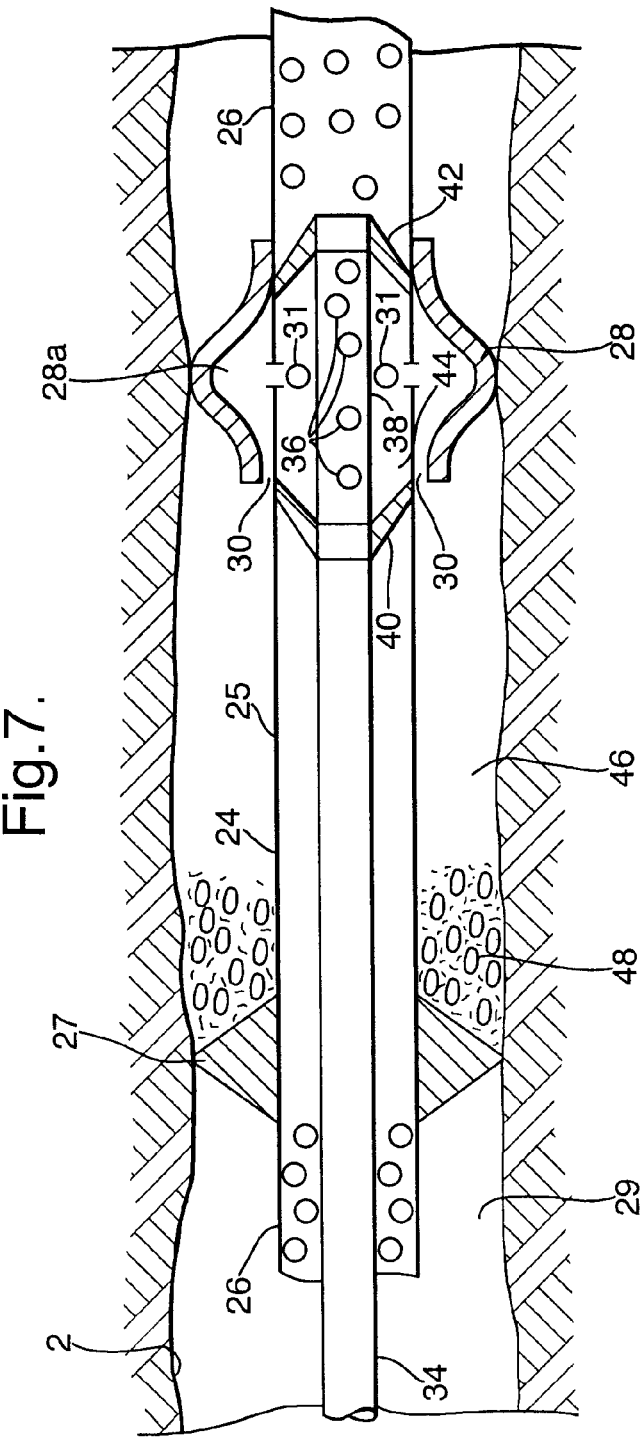
FIG. 7 schematically shows a detail of the completion string of FIG. 6 on a larger scale.

Referring to FIGS. 6 and 7 there is shown a wellbore 2 provided with a completion string 24 arranged in a horizontal section of wellbore 2 extending into a hydrocarbon reservoir formation. The horizontal wellbore section is of irregular shape in view of the presence of washed-out portions in the wellbore. Hereinafter, references to "upper" and "lower" in relation to the horizontal wellbore section are to be understood as referring to wellbore positions measured from surface along the longitudinal axis of the wellbore. The completion string 24 includes a series of blank pipe sections 25 and perforated pipe sections 26 arranged in alternating order. The blank pipe sections 25 are located at predetermined positions in the wellbore where formation water is expected to enter the wellbore. Such positions are, for example, positions where fluid losses have been experienced during drilling of the wellbore due to the presence of formation fractures which potentially are in fluid communication with a water-bearing layer. The perforated pipe sections 26 are arranged at wellbore locations where hydrocarbon fluid is to be produced from the reservoir formation.

Each blank pipe section 25 is at its upper end provided with a centraliser 27 for centralizing the completion string 24 in the wellbore 2, and at its lower end with a flexible seal sleeve 28 suitable of being expanded against the wellbore wall. The flexible seal sleeve 28 has a curved shape so as to enclose an annular chamber 28a between the sleeve 28 and the completion string 24. The centraliser 27 of each blank pipe section is provided with flow-openings (not shown) capable of blocking axial flow of swelleable rubber particles through the annular space 29 formed between the wellbore wall and the completion string 24 while allowing axial flow of fluid through the annular space 29. The seal sleeve 28 of each blank pipe section is at its lower end fixedly and sealingly connected to the completion string 24, and is at its upper end loosely arranged around the completion string 24 so as to leave a small annular gap 30 (FIG. 7) between the upper end of seal sleeve 28 and completion string 24. Each blank pipe section 25 is provided with a row of circumferentially spaced holes 31 located under the respective flexible seal sleeve 28, the holes 31 being of a size large enough to allow passage of swelleable rubber particles therethrough.

A coil tubing string 34 extends from surface into the completion string 24 whereby the lower end of the coil tubing string 34 is positioned at the level of the flexible seal sleeve 28 of one of the blank pipe sections 25. The coil tubing string 34 has a closed lower end, and is provided with a series of radial ports 36 arranged in a lower end part 38 of the string 34. The coil tubing string 34 is further provided with two cup seals 40, 42 which seal against the inner surface of the completion string 24, the cup seals 40, 42 being arranged at either side of the series of radial ports 36. The radial ports 36 are of a size large enough to allow passage of swelleable rubber particles therethrough.

Figure 8:
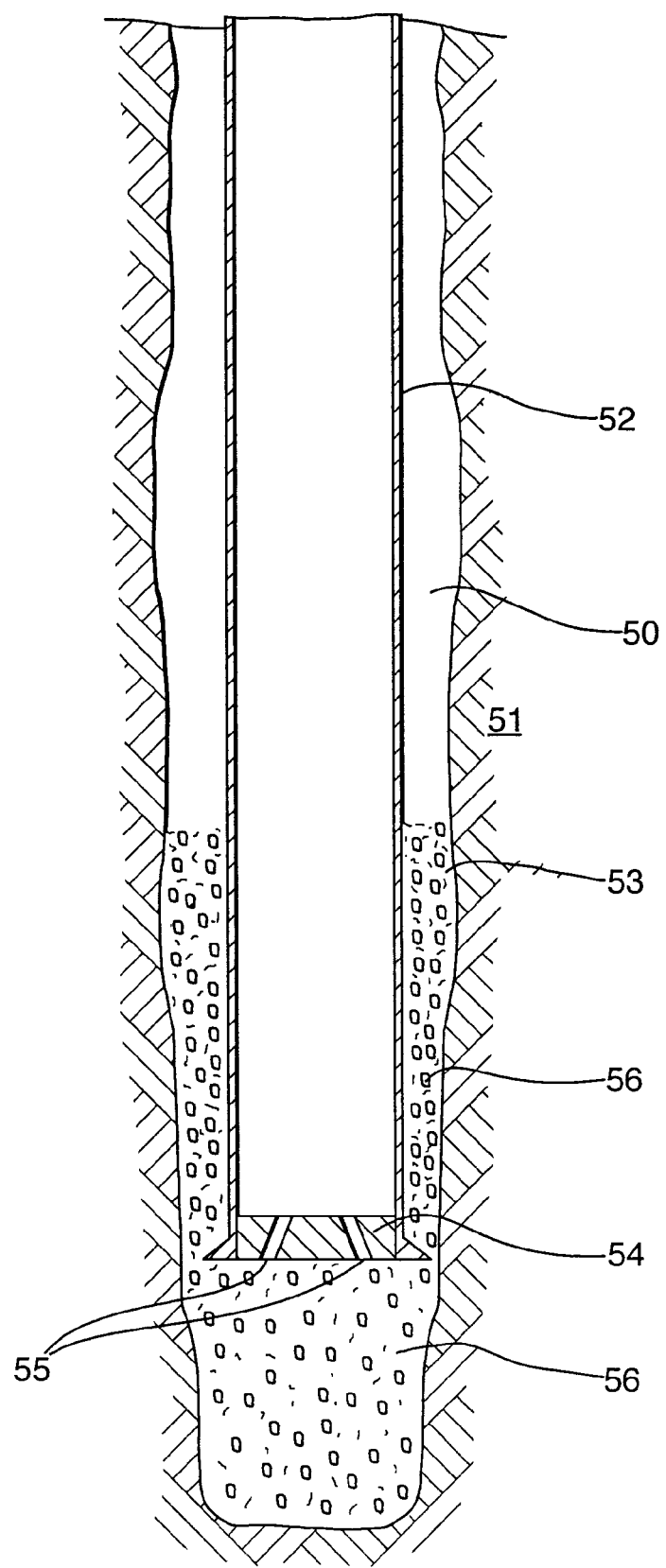
FIG. 8 schematically shows a wellbore provided with a casing and an annular seal at the lower end thereof.

Referring to FIG. 8 there is shown a wellbore system for the production of oil, including a wellbore 50 formed in an earth formation 51. An intermediate casing 52 extends from surface into the wellbore 50 hereby an annular space 53 is formed between the casing 52 and the wellbore wall. The casing 52 is at its lower end provided with a casing shoe 54 having ports 55 of a size large enough to allow passage of swelleable rubber particles therethrough. A lower end portion of the wellbore 50 is filled with a pack 56 of swelleable rubber particles. The pack 56 extends into the annular space 53 up to length of several tenth of meters thereof. The swelleable particles are made of composition 900 70-1236 referred to above, and are provided with a metal core so as to significantly increase the weight of the particles.

During normal use of the wellbore system shown in FIG. 4, the casing 4 is lowered into the wellbore 2 and suspended in the wellbore at the desired depth. The swelleable rubber particles are mixed into a stream of oil based fluid at surface, which stream is then pumped into the casing 4 and thereby flows down the casing 4 and, via the lower open end of the casing 4, up through the annular space 6. As the stream arrives at the centraliser 10, the rubber particles become blocked by the centraliser 10, while the oil based fluid flows along the centraliser 10 in upward direction. The blocked rubber particles become packed in the annular space 6 by upward pressure exerted by the stream of fluid to the particles. If required, the casing 4 can be radially expanded before or after the rubber particles have been installed in the annular space 6. If the casing is expanded after the particles have been installed, the packing density of the particles increases.

After the wellbore system 1 has been taken in production, it may occur that saline formation water from the surrounding earth formation 3 enters the wellbore and thereby comes into contact with the rubber particles. Since the concentration of salt in the swelleable particles is much higher than the salt concentration in the formation water, permeation of formation water into the rubber matrix material will occur as a result of osmosis, thus inducing swelling of the rubber particles. As a result, the swollen rubber particles become tightly packed and thereby form an annular seal layer in the annular space 6. The annular seal layer provides zonal isolation between the lower portion 14 of the annular space 6 and the upper portion 16 thereof.

During normal use of the wellbore system of FIG. 5, the casing 18 and the slotted production liner 20 are fixed in the wellbore, whereafter the gravel pack 22 with the rubber particles included therein, is inserted in conventional manner. As the well is taken in production, crude oil flows from the oil bearing formation into gravel pack 22, and from there into the slotted production liner 20. After a period of time of prolonged oil production from the well, saline formation water may enter the wellbore 2. Flow of saline formation water through the gravel pack 22 induces swelling of the rubber particles present in the gravel pack. After swelling, the rubber particles block further flow of formation water through the gravel pack 22 and thereby prevent entry of the formation water into the slotted production liner 20. The rubber particles in the portion of the gravel pack located above the water level do not become in contact with the formation water, and therefore do not swell. Thus, production of crude oil through said upper portion of the gravel pack remains unaffected. In this manner it is achieved that inflow of formation water into the production liner is significantly reduced, or prevented.

During normal use of the wellbore system of FIGS. 6 and 7, the coil tubing string 34 is lowered through the completion string 24 until the lower end part 36 of the coil tubing string 34 is positioned at the level of the flexible seal sleeve 28 of the lowermost blank pipe section 25. In this position, the cup seals 40, 42 enclose an annular space 44 between the coil tubing string 34 and the completion string 24, which is in fluid communication with both the holes 31 in the lowermost blank pipe section 25 and the radial ports 36 in coil tubing string 34. A stream of oil based fluid and swelleable rubber particles of composition 900-70-1236 is then pumped from surface into the coil tubing string 34. The stream of fluid and rubber particles flows from the coil tubing string 34 via the radial ports 36 into the annular space 44. From there the stream flows via holes 31 into annular chamber 28a and subsequently via annular gap 30 into a portion 46 of the annular space 29 located between the centraliser 27 and the flexible seal sleeve 28. The swelleable particles cannot pass through the flow-openings of the centraliser 27, and thereby become blocked into said annular space portion 46. The oil based fluid of the stream flows further via the flow-openings of the centraliser 27 and the remainder of annular space 29, to surface. In this manner a pack 48 of swelleable rubber particles is formed in the annular space portion 46, which pack 48 gradually fills the entire annular space portion 46.

After the lowermost annular space portion 46 is completely filled with swelleable rubber particles, pumping is stopped and the coil tubing string 34 is pulled upward until the lower end part 38 thereof is positioned at the level of the flexible seal sleeve 28 of the next blank pipe section 25. Swelleable rubber particles are then pumped into the annular space portion 46 pertaining to said next blank pipe section 25 in a similar manner. The procedure is repeated until all respective annular space portions 46 which are to be closed-off, are packed with swelleable rubber particles. The coil tubing string 34 is subsequently removed from the wellbore 2.

If undesired formation water enters the wellbore 2 after the well has been taken in production, the formation water eventually contacts the swelleable rubber particles in one or more of the annular space portions 46. The rubber particles thereby swell and form a tight seal in the respective annular space portions 46. In this manner it is achieved that formation water entering the wellbore 2, is prevented from being produced to surface via the perforated pipe sections 26 of completion string 24.

During normal use of the wellbore system of FIG. 8 the casing 52 is lowered into the wellbore 50 and suspended at a depth whereby the lower end of the casing is a short distance from the wellbore bottom. The swelleable rubber particles are mixed into a stream of oil based fluid at surface and pumped into the casing 52 whereby the particles flow into the lower end part of the wellbore 50 and from there into the annular space 53. By virtue of their increased weight, the particles settle in the open-hole section of the wellbore 50 and the lower portion of the annular space 53. The particles are then induced to swell by pumping water into the casing 52 thereby forming a pack of swollen particles.

In this manner it is achieved that a tight seal is created in the annular space between the intermediate casing and the wellbore wall without the need to pump cement in the annular space. The wellbore 50 is thereafter drilled further until a next casing is to be installed in the wellbore, and the previous step is then repeated in a similar manner.

It is thereby achieved that placement of the swelleable particles at the desired location in the wellbore is relatively easy because the particles are relatively small before swelling and can therefore pass through narrow passages in the wellbore. Furthermore the particles enter into irregularities which may be present in the space to be sealed, and completely seal such irregularities after swelling of the particles. The step of inducing the selected fluid to flow into contact with the swelleable particles includes applications whereby the selected fluid is actively pumped towards the swellable particles, as well as applications whereby the selected fluid is allowed to flow naturally towards the swelleable particles. For example the selected fluid can be water or oil which flows from the earth formation into the wellbore, or water which migrates out of a cement layer arranged in the proximity of the swelleable particles.

Suitably the swelleable particles are inserted into said space by pumping the swelleable particles in a stream of carrier fluid into said space. If the swelleable particles swell only very slowly upon contact with the selected fluid, the carrier fluid can be the selected fluid. Thus, in such application the swelleable particles and the selected fluid are pumped simultaneously in a single stream. Alternatively, the swelleable particles can be pumped first, and the selected fluid thereafter.

We claim:

1. A method of sealing a space in a wellbore formed in an earth formation, the method comprising:
    inserting a plurality of swelleable particles into said space, the particles being susceptible to swelling upon contact with a selected fluid; and
    inducing said selected fluid to contact the swelleable particles whereby the swelleable particles swell so as to form a body of swollen particles in said space,
    wherein the step of inserting the particles into said space comprises pumping the swelleable particles in a stream of carrier fluid into the space;
    wherein said plurality of swelleable particles comprises at least one of a first group of particles susceptible to swelling upon contact with hydrocarbon fluid, and at least one of a second group of particles susceptible to swelling upon contact with water; and
    wherein said plurality of swelleable particles includes particles which are susceptible to swelling upon contact with water from the earth formation and which include a matrix material provided with a compound soluble in said formation water, wherein the matrix material substantially prevents or restricts migration of the compound out of the swelleable particle and allows migration of said formation water into the swelleable particle so as to induce swelling of the swelleable particle upon migration of said formation water into the swelleable particle.

2. The method of claim 1, wherein said space is an annular space defined between a tubular element extending into the wellbore and a wall extending around the tubular element.

3. The method of claim 2, wherein the tubular element is a production conduit for transporting formation fluid to a surface, and wherein said wall is selected from the group consisting of wellbore wall and a first wellbore casing.

4. The method of claim 3, wherein said wall is the wellbore wall and the production conduit has an inlet opening for formation fluid, and wherein the step of inserting the swelleable particles comprises depositing the particles between said inlet opening and the wellbore wall.

5. The method of claim 4, wherein the annular space comprises a body of non-swelleable particles forming a gravel pack, and wherein the step of inserting the swelleable particles comprises inserting the swelleable particles into the gravel pack.

6. The method of claim 2, wherein the tubular element is a first wellbore casing, and wherein said wall is selected from the group consisting of a wellbore wall and a second wellbore casing.

7. The method of claim 6, wherein the step of inserting the swelleable particles comprises mixing the swelleable particles into a stream of cement and pumping the stream of cement with the swelleable particles included therein, into the annular space.

8. The method of claim 6, wherein the step of inserting the swelleable particles comprises pumping the swelleable particles into the annular space before or after pumping a stream of cement into the annular space.

9. The method of claim 1, wherein said matrix material is substantially impermeable to said compound or to ions of said compound.

10. The method of claim 1, wherein the matrix material comprises an elastomer matrix material.

11. The method of claim 10, wherein the elastomer matrix material comprises a rubber selected from the group consisting of NBR, HNBR, XNBR, FKM, FFKM, TFE/P and EPDM base rubber.

12. The method of claim 10, wherein the swelleable particles are obtained by a process comprising mixing the compound in a mass of elastomer forming material and vulcanizing the elastomer forming material so as to form said elastomer matrix material.

13. The method of claim 1, wherein the compound is present in the matrix material in the form of a plurality of compound particles dispersed in the matrix material.

14. The method of claim 13, wherein the compound particles are embedded in the matrix material.

15. The method of claim 1, wherein said compound comprises a salt such as a dissociating salt.

16. The method of claim 15, wherein the salt is selected from the group consisting of acetates (M-CH3COO), bicarbonates (M-HCO3), carbonates (M-CO3), formates (M-HCO2), halides (Mx-Hy)(H=Cl, Br or I), hydrosulphides (M-HS), hydroxides (M-OH), imides (M-NH), nitrates (M-NO3), nitrides (M-N), nitrites (M-NO2), phosphates (M-PO4), sulphides (M-S) and sulphates (M-SO4), where M is a metal selected from the group of metals of the periodic table.

17. The method of claim 15, wherein each swelleable particle contains at least 20 wt % salt based on the combined weight of the matrix material and the salt.

* * * * *